US008146895B2

(12) United States Patent
Hills

(10) Patent No.: US 8,146,895 B2
(45) Date of Patent: Apr. 3, 2012

(54) APPARATUS FOR MIXING GASSES AND LIQUIDS

(76) Inventor: Blair H. Hills, Charleston, WV (US)

( * ) Notice: Subject to any disclaimer, the term of this patent is extended or adjusted under 35 U.S.C. 154(b) by 1233 days.

(21) Appl. No.: 11/693,503

(22) Filed: Mar. 29, 2007

(65) Prior Publication Data

US 2007/0228584 A1    Oct. 4, 2007

Related U.S. Application Data

(60) Provisional application No. 60/788,419, filed on Mar. 31, 2006.

(51) Int. Cl.
  *B01F 3/04*    (2006.01)
(52) U.S. Cl. ................................. 261/87; 261/91; 261/93
(58) Field of Classification Search ................. 261/84, 261/87, 61, 92, 93, 120, 123, 91
  See application file for complete search history.

(56) References Cited

U.S. PATENT DOCUMENTS

| | | | |
|---|---|---|---|
| 53,876 A | 4/1866 | Robinson | |
| 95,514 A | 10/1869 | Radbruch | |
| 1,253,394 A | 1/1918 | Lambie | |
| 2,293,183 A | 8/1942 | Walker | |
| 2,433,592 A | 12/1947 | Booth | |
| 3,393,802 A * | 7/1968 | Logue et al. | 209/169 |
| 3,485,484 A * | 12/1969 | Quinchon | 261/87 |
| 3,532,327 A | 10/1970 | Landberg | |
| 3,630,498 A | 12/1971 | Bielinski | |
| 3,643,403 A | 2/1972 | Speece | |
| 3,677,528 A | 7/1972 | Martin | |
| 3,775,307 A | 11/1973 | McWhirter at al. | |
| 3,856,272 A | 12/1974 | Ravitts | |
| 3,911,064 A | 10/1975 | McWhirter et al. | |
| 4,064,403 A | 12/1977 | Miller | |
| 4,095,918 A | 6/1978 | Mouton, Jr. et al. | |
| 4,169,047 A * | 9/1979 | Wilson | 209/164 |
| 4,193,950 A * | 3/1980 | Stockner et al. | 261/87 |

(Continued)

FOREIGN PATENT DOCUMENTS

JP            O4197496        7/1992

OTHER PUBLICATIONS

"Deep Tank Aeration with Blower and Compressor Considerations," Aeration: Principles and Practice, pp. 147-197.

(Continued)

*Primary Examiner* — Charles Bushey
(74) *Attorney, Agent, or Firm* — Alan G. Towner, Esq.; Matthew W. Gordon, Esq.; Pietragallo Gordon Alfano Bosick & Raspanti, LLP

(57) ABSTRACT

An apparatus for mixing gas and liquid is disclosed. The apparatus may have a plurality of blades rotated about a common shaft. The blades may have a forward portion, which cuts through a liquid, and a trailing portion, which forms the leading part of a gas cavity. The gas cavity is in communication with a gas inlet and the bulk fluid. As the blades pass through a liquid, a reduced pressure zone is formed immediately behind the blade. The reduced pressure zone allows air to be aspirated from the gas inlet into the gas cavity adjacent to the blade. Gas in the gas cavity is sheared into discrete bubbles and transferred to the liquid by the action of the trailing blade wake currents.

15 Claims, 9 Drawing Sheets

U.S. PATENT DOCUMENTS

| | | | |
|---|---|---|---|
| 4,200,597 A * | 4/1980 | Baum | 261/87 |
| 4,231,974 A * | 11/1980 | Engelbrecht et al. | 261/87 |
| 4,242,289 A | 12/1980 | Blum | |
| 4,364,826 A * | 12/1982 | Kato | 210/150 |
| 4,371,480 A | 2/1983 | Vos | |
| 4,512,936 A | 4/1985 | Oshima et al. | |
| 4,519,715 A | 5/1985 | Golobic et al. | |
| 4,904,420 A * | 2/1990 | Cornelissen | 261/92 |
| 4,908,131 A * | 3/1990 | Moore | 210/219 |
| 5,043,104 A | 8/1991 | Stirling | |
| 5,112,192 A | 5/1992 | Weetman | |
| 5,116,501 A | 5/1992 | House | |
| 5,156,778 A * | 10/1992 | Small | 261/87 |
| 5,171,486 A | 12/1992 | Penno | |
| 5,431,860 A | 7/1995 | Kozma et al. | |
| 5,525,269 A | 6/1996 | Connolly et al. | |
| 5,711,902 A | 1/1998 | Hsu | |
| 5,755,976 A | 5/1998 | Kortmann | |
| 5,916,491 A | 6/1999 | Hills | |
| 5,921,745 A | 7/1999 | Round et al. | |
| 5,925,290 A | 7/1999 | Hills | |
| 5,948,326 A * | 9/1999 | Pate | 261/91 |
| 6,017,020 A | 1/2000 | Baughman et al. | |
| 6,077,424 A | 6/2000 | Katsukura et al. | |
| 6,135,430 A | 10/2000 | Bergman, Jr. et al. | |
| 6,145,815 A | 11/2000 | Cheng et al. | |
| 6,273,402 B1 | 8/2001 | Cheng | |
| 6,499,727 B1 * | 12/2002 | Sylvester | 261/92 |
| 6,877,959 B2 | 4/2005 | McWhirter | |
| 7,427,058 B2 * | 9/2008 | Galletta, Jr. | 261/91 |

OTHER PUBLICATIONS

"Surface and Mechanical Aeration," Aeration: Principles and Practice, pp. 199-240.

J. R. McWhirter et al., "Oxygen Mass Transfer Fundamentals of Surface Aerators," Ind. Eng. Chem. Res., vol. 34, No. 8, 1995, pp. 2644-2654.

* cited by examiner

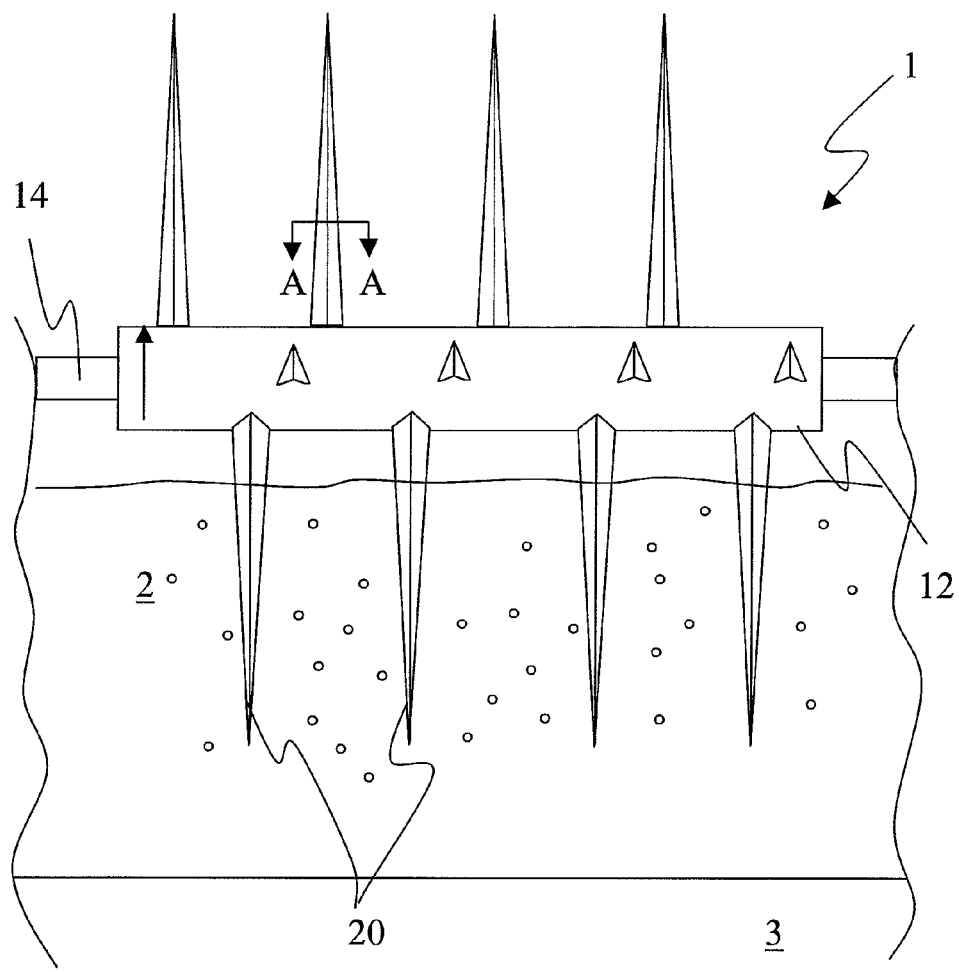
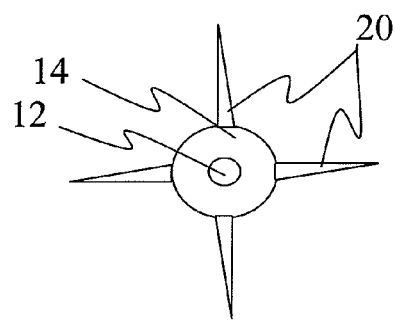
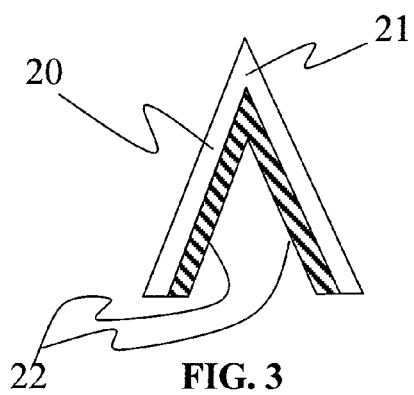
FIG. 1
FIG. 2
FIG. 3

APPARATUS FOR MIXING GASSES AND LIQUIDS

CROSS REFERENCE TO RELATED APPLICATION

This invention claims the benefit of U.S. Provisional Application Ser. No. 60/788,419 filed Mar. 31, 2006. This application is related to U.S. application Ser. No. 11/668,816, filed Jan. 30, 2007 to Blair Howard Hills. Both of which are herein incorporated by reference.

FIELD OF THE INVENTION

The present invention relates to gas and liquid mixers for use in various applications such as wastewater systems, chemical reactors, mass transfer systems and the like.

BACKGROUND INFORMATION

Gas-liquid mixing systems are conventionally used for many purposes, such as the mass transfer of gases into and/or out of liquids. Oxidation and reduction reactions often require that a gas, such as oxygen, chlorine or hydrogen, be mixed with liquids in the presence of solids. Unwanted gases dissolved in liquids can be stripped from the liquid by mixing a desired gas into the liquid. Direct contact heating of a liquid requires that a hot gas be mixed into a liquid, and, in some instances, the pH of a liquid can be adjusted by mixing a gaseous acid or base into the liquid.

For example, oxygen gas is often mixed with various liquids. Oxygen gas can be mixed with activated sludge to aerate waste material and assist in digestion, it can be used to oxidize carbon, sulfur and/or nitrogen containing material in a liquid, it can also be mixed with liquids containing organic compounds to oxidize the organic compounds into alcohols, aldehydes and acids, or it can be mixed with hydrometallurgical process liquids to achieve various desired effects. Oxygen gas can also be mixed with liquids to oxidize nitrogen-containing compounds into nitroso-containing materials, nitrites and/or nitrates. Oxygen gas can be mixed with liquids to oxidize sulfur-containing compounds into disulfides, sulfoxides and/or sulfates.

The formation of hydrogen sulfide can occur in any aquatic based system containing sulfates in which the dissolved oxygen does not meet the oxygen demand. Even small quantities of hydrogen sulfide can produce objectionable odors thereby necessitating that oxygen be mixed into the liquid. Industrial and municipal wastewater can also be treated by biological treatment techniques in which aerobic microorganisms convert contaminants into oxidized compounds such as carbon dioxide gas and biomass. Sufficient oxygen must be provided to the aerobic organisms in order to carry out the necessary biological processes, chemical oxidation and/or fermentation processes.

Hydrogen gas can also be mixed with various liquids or liquid solid mixtures. For example, hydrogen gas can be used to saturate carbon-carbon double bonds and to reduce nitro and nitroso compounds in organic materials. Hydrogen gas can also be mixed into liquids present in vegetable oils processing, yeast production, vitamin C production, coal liquefaction, and the production of other types of unsaturated organic liquids. Chlorine gas can also be mixed with organic and inorganic liquids. Carbon monoxide gas can also be mixed with liquids containing organic compounds. In each of these examples, gas can be mixed into a liquid to dissolve and react with the liquid and/or liquid solid mixture to achieve various desired effects.

Conventional gas-liquid mixing systems can be typically classified as either surface aerators or diffused gas delivery systems. Diffused gas delivery systems that require gas compression typically comprise coarse, medium or fine bubble diffusers, liquid motive force venturi, jet type mixers that require large pumping systems, or agitators that utilize hollow members or spargers positioned downstream of them to deliver pressurized gas to a mixing zone. Diffused gas delivery systems that do not require gas compression equipment typically comprise self-inducing systems such as venturi systems, vortex systems, and rotor/stator pitched blade turbine reactors.

In traditional systems, the delivery of gas to the desired liquid depth requires the use of fans, blowers, compressors, venturi or vortex systems to entrain the gas or compress the gas to a pressure equal to or greater than the static head at the desired liquid depth. Some traditional systems deliver compressed gas to a porous material, such as a fine hole matrix, mesh or membrane, that is permanently mounted near the bottom of a tank to disperse gas. However, these porous materials are easily fouled and can become blocked when placed in dirty liquids, liquids having a high particulate concentration or high soluble mineral concentration. Fouled materials reduce efficiency, increase operational energy cost, and increase bubble size. Porous materials can also stretch over time, thereby increasing hole size and bubble formation diameter, or harden, thereby causing increased pressure. Larger bubbles, caused by larger hole size, increased pressure or fouling, reduce the available gas-liquid surface area, which reduces the overall Standard Aeration Efficiency (SAE). The efficiency of fouled, blocked or stretched materials can drop to only 30% to 40% of their stated SAE in clean water.

To remedy the higher energy costs associated with fine bubble diffusers, additional energy, maintenance and/or replacement equipment is often needed. Periodic cleaning and maintenance often involve expensive and hazardous HCl injections into the diffuser system and/or the emptying of the aeration vessel followed by physical cleaning. Plastic membranes must be periodically changed, which increases labor, materials and processing costs associated with an aeration system shut-down during installation.

Non-mechanical diffused gas-liquid mass transfer systems, especially those using fine bubble diffusers, can deliver standard aeration efficiency (SAE) of 1.6 to 7 kilograms of dissolved oxygen (DO) from air per kilowatt-hour (kg/kWh) in clean water (SAE-ANSI/ASCE Standard 2-91). Their efficiency, even when clean, is frequently reduced by the low intensity of the liquid mixing when placed in operating systems. The efficiency of a non-mechanical diffused gas-liquid mass transfer system in dirty or contaminated liquid is frequently reduced to only 40 to 50% of the clean water efficiency of the system.

Some examples of diffused aeration systems that are not based on fine bubble diffusers include traditional mechanical diffused aeration systems. Traditional diffused aerator systems can include a high speed prop mixer and a regenerative blower, such as the commercially available Aire-$O_2$ Triton®, large volume per time liquid mixing systems using a gas compressor, such as the draft tube aeration system commercially available from, for example, Philadelphia Mixers Corp., and jet aeration systems using a gas/liquid mixing jet, a liquid pump and a gas compression device, such as systems commercially available from US Filter Corporation and others.

Other traditional mechanical diffused aeration systems do not use a compressor, however, these systems require a vortex or a venturi system to create gas pockets at some depth below the surface of the liquid. Examples of these traditional mechanical diffused aeration systems include: U.S. Pat. No. 6,273,402 for a Submersible In-Situ Oxygenator, U.S. Pat. No. 6,145,815 for a System for Enhanced Gas Dissolution Having a Hood Positioned Over the Impeller with Segregating Rings, U.S. Pat. No. 6,135,430 for Enhanced Gas Dissolution, U.S. Pat. No. 5,916,491 for Gas-Liquid Vortex Mixer and Method, and U.S. Pat. No. 5,925,290 for Gas-Liquid Venturi Mixer, each of which are incorporated by reference herein.

In each of these traditional gas-liquid mixing systems that do not require a compressor, either liquid pumps or mixers are required to create high liquid velocities within the system. In order to introduce gas into the system, a velocity head must be created that is greater than the static head at the desired liquid depth at which the gas is introduced to the liquid. To overcome this static head, traditional systems require a liquid moving device, such as an axial or radial liquid pump or mixer, to accelerate a volume of liquid at a high velocity within a tank or holding area.

Conventional mechanical diffused air systems typically have an SAE of from 0.4 to 1.6 kg/kWh. Typically, low speed surface aerators give the highest SAE for mechanical aeration systems. These systems typically state an SAE of from 1.9 to 2.5 kg/kWh. However, surface aerators achieve low gas utilization and require large volumes of gas to be mixed with liquid, causing a high rate of off-gassing, which strips volatile organics from the liquid into the gas, cools the mixture thereby reducing the biological reaction rate, and freezing components of the system during winter operation.

The present invention has been developed in view of the foregoing and to remedy other deficiencies of related devices.

SUMMARY OF THE INVENTION

The present invention provides an apparatus for mixing gas and liquid. The apparatus may have a plurality of blades rotated about a common shaft. The blades may have a forward portion, which cuts through a liquid, and a trailing portion. Gas cavities may form either on, adjacent to or trailing the blade depending on the blade's shape. The gas cavity is in communication with a gas inlet. As the blades pass through a liquid, a reduced pressure zone is formed immediately behind the blade. The reduced pressure zone allows air to be aspirated from the gas inlet into the gas cavity where it is transferred to the liquid.

An aspect of the present invention provides an apparatus for mixing gas and liquid comprising a rotatable shaft having an axis of rotation, and at least one pumping blade at least partially submergible in the liquid mounted on the rotatable shaft, the at least one pumping blade comprising a gas cavity adjacent to or trailing the at least one pumping blade, wherein rotation of the at least one pumping blade through the liquid causes the liquid to move in a direction substantially perpendicular to the axis of rotation of the rotatable shaft and causes the gas to be entrained in the liquid from the gas cavity.

Another aspect of the present invention provides an apparatus for mixing gas and liquid comprising a rotatable shaft, at least one radially pumping blade at least partially submerged in a liquid, the at least one radially pumping blade comprising a gas cavity adjacent a trailing portion of the at least one blade, means for attaching the at least one radially pumping blade to the rotatable shaft and a gas inlet above the liquid in communication with the gas cavity of the at least one blade.

A further aspect of the present invention is a method for mixing gas and liquid comprising providing a at least one blade at least partially submerged in a liquid, the at least one blade comprising a gas cavity adjacent to or opposite a leading forward portion of the at least one blade, providing a gas inlet above the liquid in communication with the gas cavity of the at least one blade, and propelling the at least one blade through the liquid to create a reduced pressure zone behind the at least one blade and aspirate gas from the gas inlet into the gas cavity.

These and other aspect will become more apparent from the following description.

BRIEF DESCRIPTION OF THE DRAWINGS

FIG. 1 illustrates a horizontally mounted inline mixer with inline blades for creating low-pressure zones for air entrainment in a liquid according to one embodiment of the present invention.

FIG. 2 illustrates a side-view of the inline mixer of FIG. 1 according to one embodiment of the present invention.

FIG. 3 is a cross-section of a inline blade along section A-A of FIG. 1, showing a forward portion and gas cavity according to one embodiment of the present invention.

DETAILED DESCRIPTION

Figure 4:
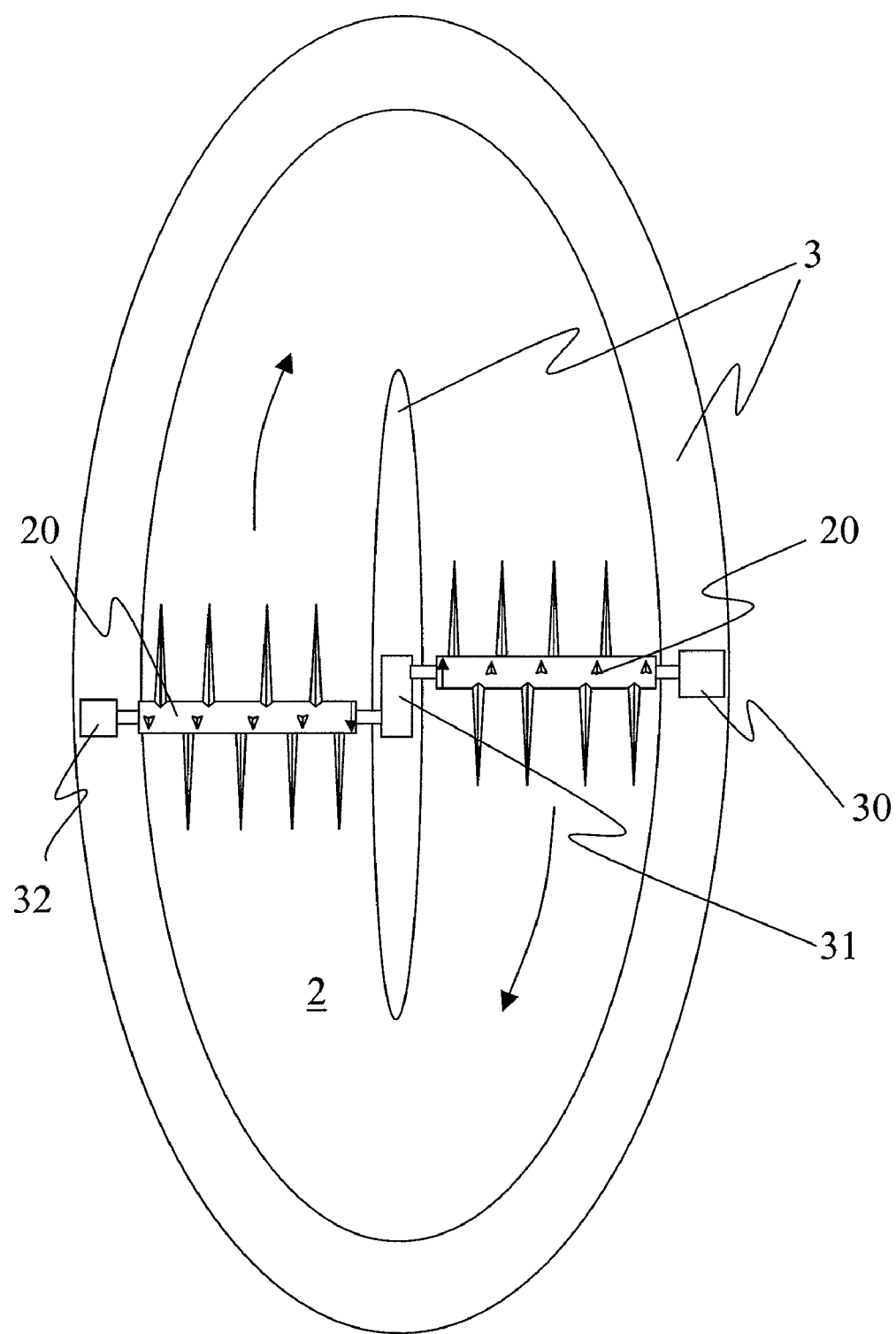
FIG. 4 illustrates two inline mixers aerating an activated sludge racetrack type containment vessel according to one embodiment of the present invention.

The present invention relates to an apparatus for mixing gas and liquid by accelerating a body of liquid in the desired direction utilizing a shaft defining an axis of rotation to rotate one more pumping blades through the bulk liquid at a relatively high velocity to generate a low pressure zone in the liquid. The low pressure zone draws gas from a gas inlet through an unobstructed passage ending with a gas cavity in the liquid partially defined by a portion of the pumping blade and partially defined by the liquid. The blade's wake current, which is the thin film of liquid that passes near the blade and moves at much higher velocities than the bulk fluid, envelops the gas cavity and shears the bulk gas cavity into small bubbles, whereby gas is aspirated in into the liquid.

As used herein, the term "pumping blade" refers to a blade that imparts movement of the bulk liquid as well as gas entrainment into the liquid under the surface of the liquid, resulting in movement of the bulk liquid and entrained gas mixture in a controlled direction. Movement of the pumping blade through the liquid thus creates gas entrainment under the surface of the liquid rather than by spraying or otherwise projecting the liquid over its surface. As used herein, an "inline pumping blade" refers to a pumping blade which imparts bulk liquid movement in at least one direction substantially perpendicular to the axis of rotation of the shaft upon which the blade is mounted, and which imparts little or no bulk liquid movement in a direction parallel to the axis of rotation of the shaft. As used herein, a "radially pumping blade" refers to a pumping blade which imparts bulk liquid movement in directions substantially perpendicular to, and radially outward from, the axis of rotation of the rotating shaft, and which imparts little or no bulk liquid movement in a direction parallel to the axis of rotation of the shaft. Thus, the blade assemblies of the present invention are perpendicular flow-generating blade assemblies rather than axial flow-generating blade assemblies.

Referring now to FIG. 1, a mixer 1 is shown according to one embodiment of the present invention. In this embodiment, the mixer 1 is an inline aerator having an outer shaft 12 on a horizontally mounted shaft 14. The drive shaft 14 is rotatably mounted and connected to a drive assembly (not shown). Projecting radially from the outer shaft 12 is a plurality of inline blades 20. As shown in FIG. 2, the inline blades 20 are preferably helically and/or equidistantly spaced about the hub 12 in multiple rows to eliminate out of balance rotation. While four rows of inline blades 20 are shown, this number can be increased or decreased without deviating from the present invention. Also, the inline blades may or may not be aligned in rows. The arrows in FIG. 1 indicate rotation.

As seen in FIG. 1 and FIG. 3, inline blades 20 may be generally pyramidal in shape having a forward portion 21 and a gas cavity 22 opposite the forward portion. As the drive shaft 14 rotates, the forward portion 21 of each inline blade 20 enters the liquid 2 and is immediately followed by the trailing portion 22. As the inline blade 20 passes through the slower moving liquid 2, some energy from the blade is transferred to the liquid 2 to accelerate the liquid 2 and a reduced pressure zone is created immediately behind the inline blade 20 within the liquid 2. This low pressure zone allows gas, in this embodiment air, to fill a gas cavity 23 created between the blade 20 and the liquid 2. In the embodiment shown in FIG. 1, a gas inlet is formed by the trailing portion of the inline pumping blade which extends above the surface of the liquid.

The mixers 1 are shown in FIG. 4 as inline aerators 20 in a racetrack style containment vessel 3. In this embodiment, the aerators 10 are positioned above a fluid 2 similar to the orientation of FIG. 1. One aerator 10 is attached to a drive unit 30 at a first end and a power converter 31 at a second end. Another aerator 10 is connected at one end to the power converter 31 and at another end to a bearing 32. Liquid flow is shown in FIG. 4 by the arrows. In this configuration, the aerators 10 provide both circulation within the vessel 3 and aeration of the liquid. While vessel 3 is shown as an oval shaped pool in FIG. 4, it may be of any configuration capable of containing a liquid, for example, one or more channels or an open tank. Drives may be either, coupled, independent, or one drive operating two counter rotating shafts.

Figure 5:
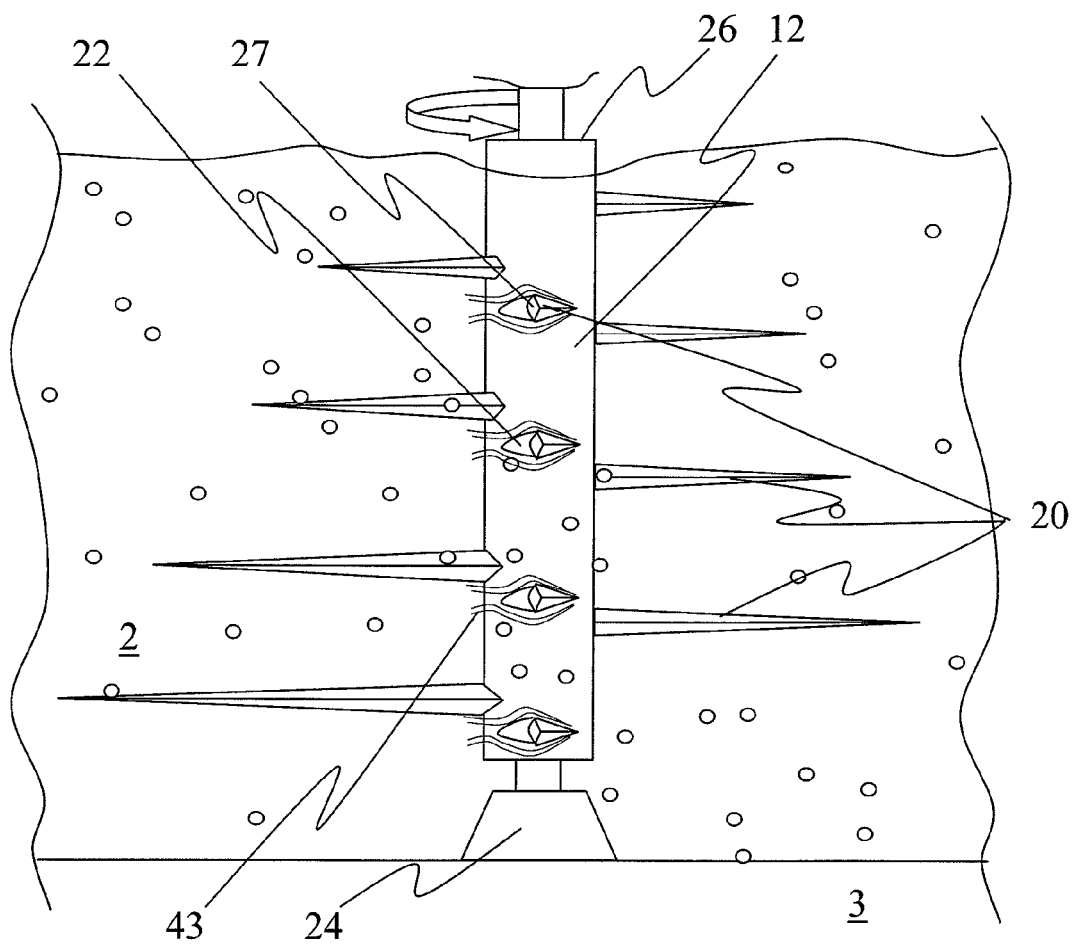
FIG. 5 illustrates a mixer on a vertically mounted shaft with inline blades of increasing length according to one embodiment of the present invention.

The mixer 1 may also have a vertically mounted shaft 14 and outer shaft 12 projecting from outer shaft 12 are inline blades 20. The inline blades 20 shown in the embodiment illustrated in FIG. 5 are of similar configuration to those blades described above. However, it should be noted that the mixer 1 shown in FIG. 5 also has a gas inlet 26 at an end of the outer shaft 12 that projects above the surface of the water 2. The outer shaft 12 may be hollow or have channels within to allow gas to be transferred to apertures 27 in the outer shaft 12. The apertures 27 near the base of the blade allow gas to pass through the outer shaft 12 and to the blades 20. The base of the blade is that portion of the blade connected to the shaft. In this embodiment, the inline blades 20 may increase in radial length from shorter blades 20 near the surface of the liquid 2 to relatively longer blades 20 at increasing depths. The longer blades are used to increase the angular velocity of the blade 20 tips, which increases the differential between the blade velocity and the liquid velocity. Accordingly, the longer inline blades 20 allow gas to be aspirated to the gas cavities 22 even at increased pressures associated with the increased depth. Gas cavities 23 and wake currents 43 are also shown in FIG. 5. As the inline blades 20 pass through the liquid a gas cavity 23 forms behind the blade 20. wake currents 43 shear gas into the liquid 2. The mixer 1 may or may not have a mounting 24 at the end of its shaft 14.

Figure 6:
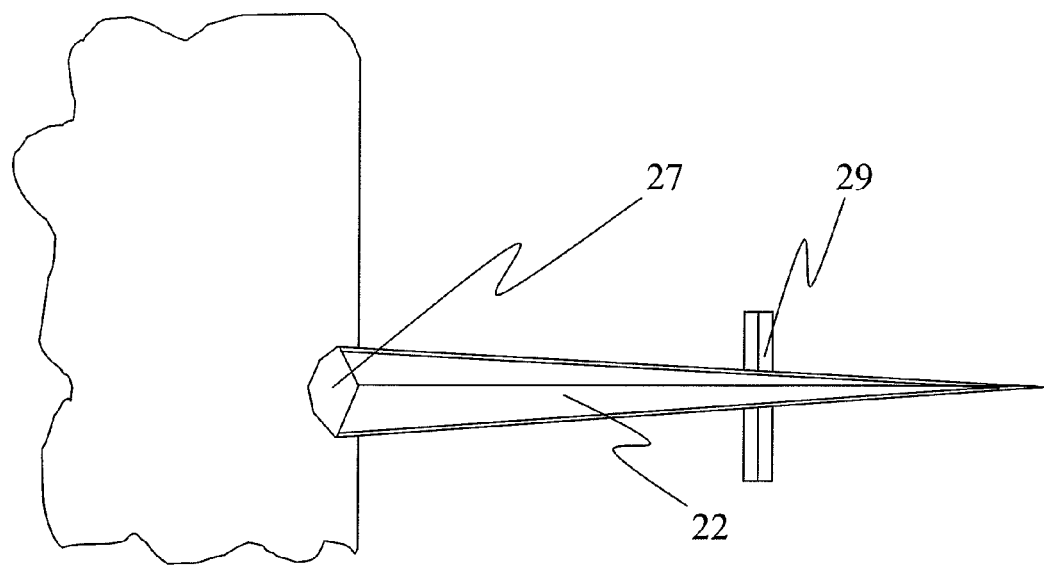
FIG. 6 illustrates a rear-view of a inline blade showing the gas cavity of the blade according to one embodiment of the present invention.
Figure 7:
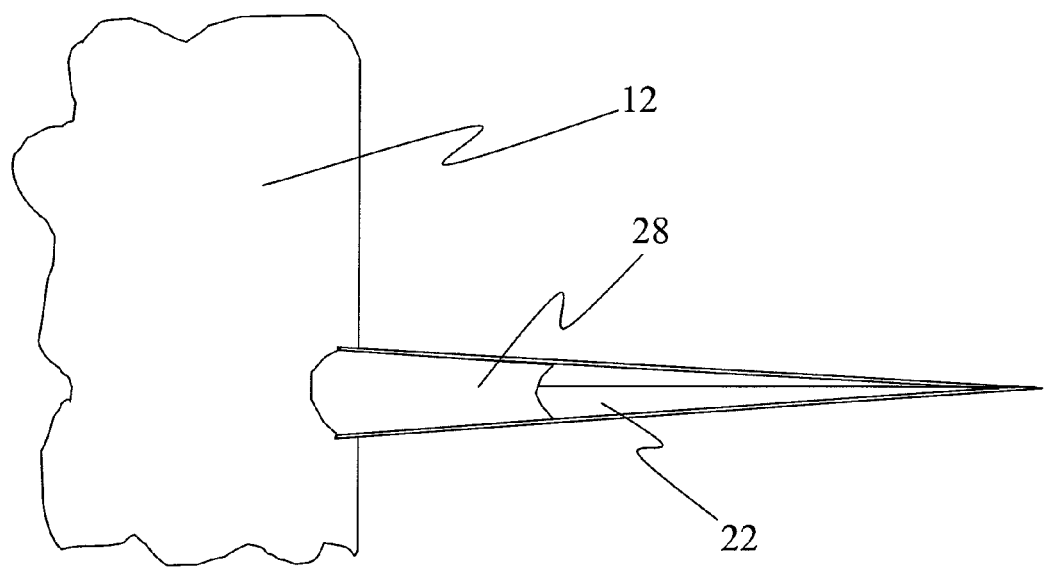
FIG. 7 illustrates a rear-view of a inline blade partially covered by a back plate according to one embodiment of the present invention.

FIG. 6 and FIG. 7 show rear portions of two different inline blades 20. Each shows a trailing portion 22. However, the inline blade 20 of FIG. 7 has an additional back plate 28. The back plate 28 allows the mixer 1 to be run at a much lower rpm than is required with a blade having a completely open trailing portion. When used on a vertically mounted mixer 1 like that of FIG. 5, the back plate 28 is often abutted to the hub 12 and projects some distance outwardly toward the tip of the blade 20. When a inline blade 20 is incorporated in a horizontally mounted mixer as shown in FIG. 1, a back plate 28 similar to that shown in FIG. 7 may be used if a gas inlet 26 is provided somewhere along the outer shaft 12 so that an unobstructed path exists from atmosphere through the trailing portion 22 to the gas cavity 43 and the liquid 2. Alternatively, when a inline blade 20 is used on a horizontal mixer like that of FIG. 1, an opening to the atmosphere may be located in the back plate 28 at some point above the surface of the liquid 2. This opening above the surface of the liquid 2 is in communication by way of the trailing portion 22 with an opening near the tip of the inline blade 20. FIG. 6 also shows a mini-blade 29 which may be attached to another blade to increase the size of the gas cavity and the liquid/gas interaction. Apertures 27 may be through the shaft near the base of the blade allow gas to pass through the outer shaft 12 and to the blades 20.

Figure 8:
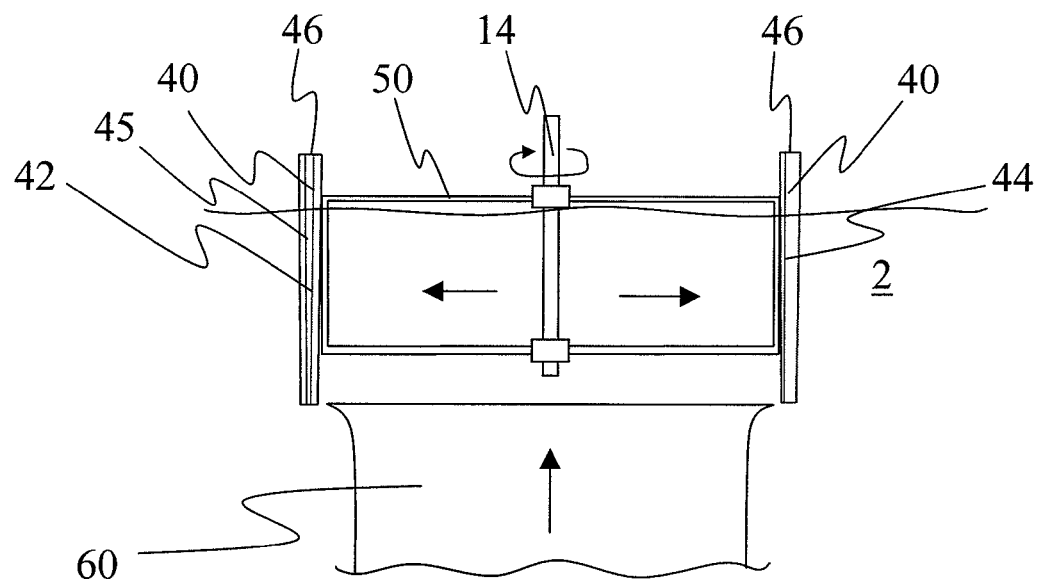
FIG. 8 illustrates a mixer with radially pumping blades in combination with a draft tube, according to one embodiment of the present invention.
Figure 9:
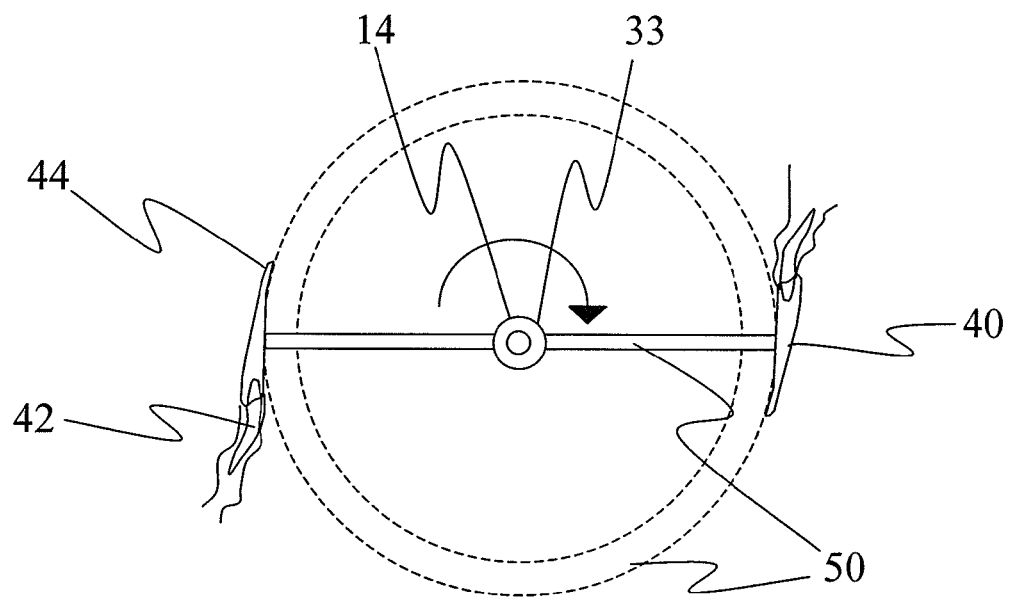
FIG. 9 illustrates a plan-view of the mixer of FIG. 8 according to one embodiment of the present invention.

Referring now to FIG. 8, a gas and liquid mixer is shown having with radially pumping blades 40. In this embodiment, a vertically mounted shaft 14 is connected to a drive assembly (not shown). Connected to the shaft and projecting radially from the shaft 14 is a frame 50. The frame 50 is connected at one end to the shaft 14 and at its outermost end to two or more radially pumping blades 40. The radially pumping blades 44 are substantially vertically oriented. The radially pumping blades 40 are rotated about the shaft 14 and have a forward portion 44, which leads the blade 40 through the liquid 2, and a trailing portion 45. Adjacent to, on, or at the trailing portion 45 of the blade is a gas cavity 42 in communication with a gas inlet 46 above the level of the liquid 2. As the radially pumping blades 40 are rotated about the shaft 14, low pressure zones develop behind the blades which permits gas to be aspirated through the gas cavities 42 and into the liquid 2. The radially pumping blades 40 generally narrow towards the forward portion 44. The gas cavity 42 in the rear of the blade 40 is widest at its uppermost portion extending above the surface of the liquid 2 and narrows as the depth of the blade increases. The arrows in FIG. 8 indicate liquid 2 flow. The mixer 1 may be positioned above a draft tube 60. In this manner, liquid 2 is aerated and directed radially outward by the radially pumping blades 40 after being drawn upward through the draft tube 60. In a mix tank, this creates a circulatory flow of the liquid 2 first, radially outward from the mixer 1, then up through the draft tube 60 before being directed radially outward again. FIG. 9 shows a plan view of the mixer of FIG. 8. In another embodiment of the present invention, the radially pumping blades 40 are diagonally oriented with respect to the shaft 14. More specifically, the blades 40 are further from the shaft 14 at a lower portion. This orientation aids in aspirating gas to the lower portion of the blades 40.

Figure 10:
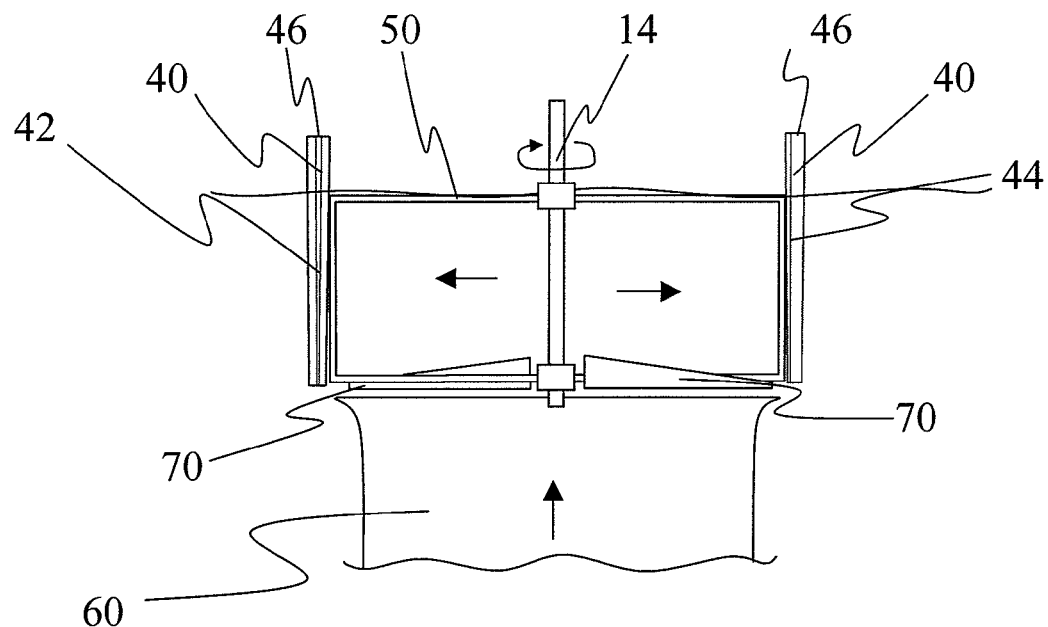
FIG. 10 illustrates a mixer having radially pumping blades and axially pumping blades in combination with a draft tube according to one embodiment of the present invention.
Figure 11:
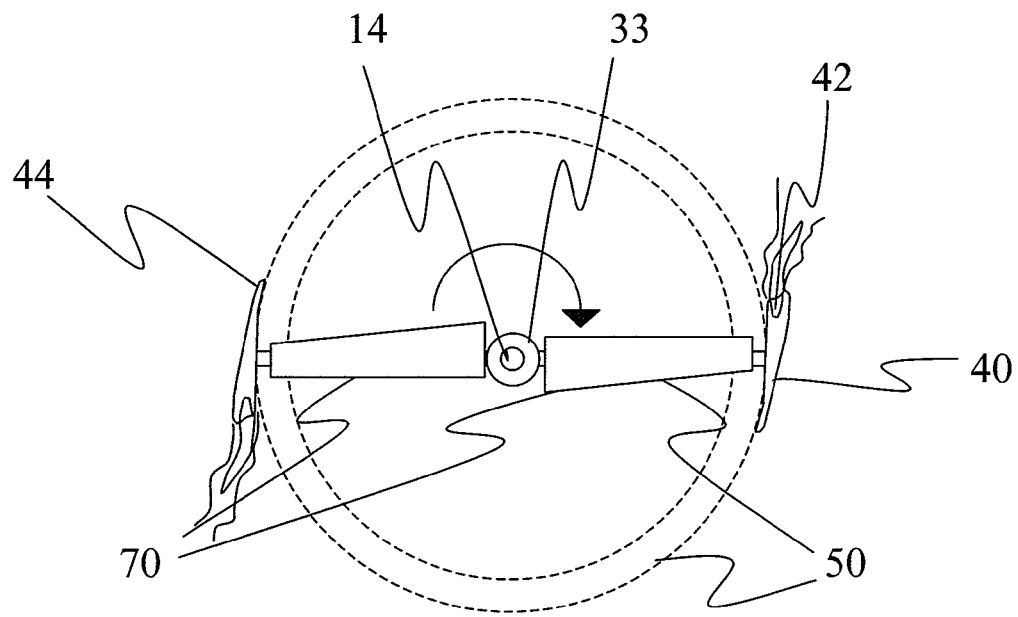
FIG. 11 illustrates a plan-view of the mixer of FIG. 10 according to one embodiment of the present invention.

Referring now to FIG. 10, a mixer 1 having radially pumping blades 44 and a draft tube 60 similar to that illustrated in FIG. 8 is shown. Additionally, the mixer 1 in FIG. 10 has axial pumping blades 70 mounted on the frame 50 in a horizontal position. The axial pumping blades 70 assist in drawing fluid 2 upwardly through the draft tube 60. Again, arrows indicate the direction of liquid 2 flow. FIG. 11 illustrates a plan view of the mixer 1 shown in FIG. 10.

Figure 12:
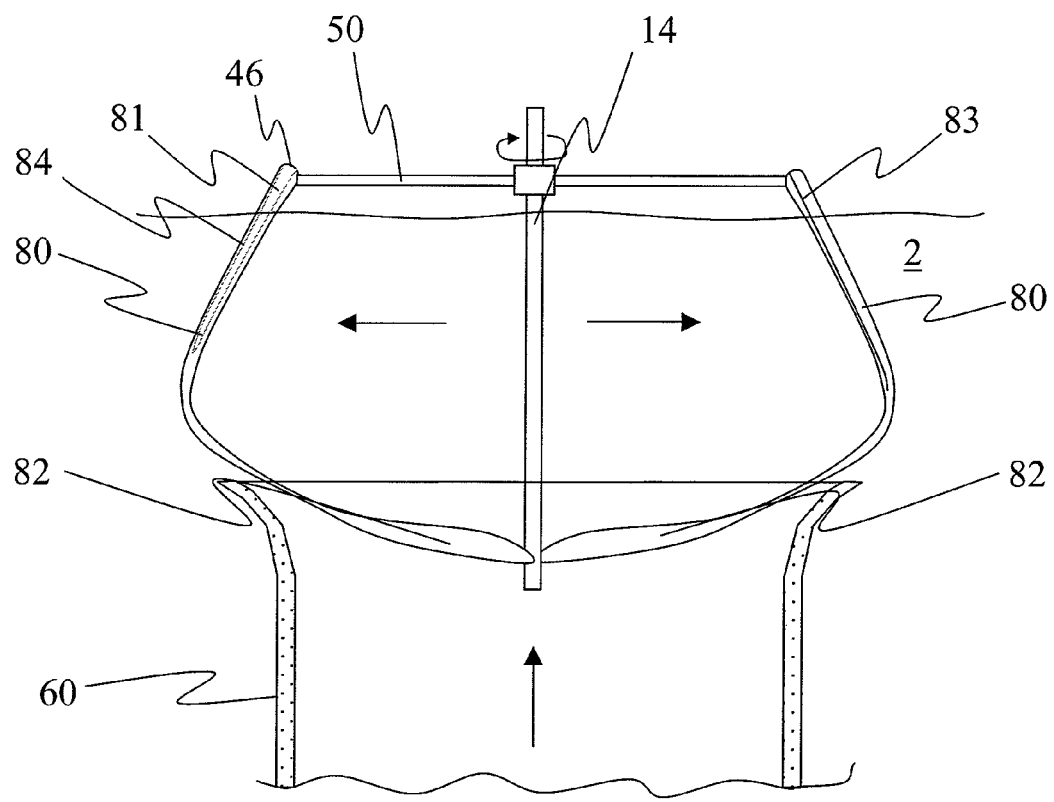
FIG. 12 illustrates a combination blade capable of axially and radially pumping the liquid in combination with the draft tube according to one embodiment of the present invention. A sectional-view of a draft tube is shown.

FIG. 12 illustrates a mixer 1 having combination blades 80 capable of axially pumping fluid upwardly from the draft tube 60 (shown in sectional view in FIG. 12) and also radially pumping and aerating the liquid 2. The combination blades 80 in this embodiment have an upper portion 81, a lower portion 82, a fuller portion 83 and a gas cavity 46. As the blades are rotated, the lower portions 82 provide upward pumping of the liquid 2 in an axial direction, while the upper portion 81 of each blade provides radial thrust of the liquid 2. Like other blades of the present invention, the upper portion 81 of a combination blade has a forward portion 83 and a trailing portion 84 at the trailing end of the combination blade 80. The gas cavity runs longitudinally along the upper portion 81 of the blade 80 and is in communication with a gas inlet 46 at a point along the blade 80 above the surface of the liquid 2.

Figure 13:
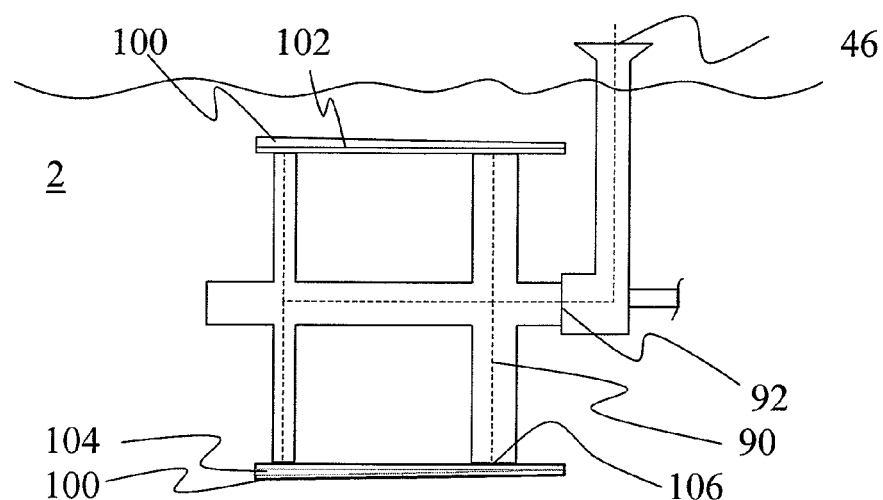
FIG. 13 illustrates a mixer having perpendicular flow to the axis of rotation pumping blades in combination with an aspirating frame and gas inlet according to one embodiment of the present invention.
Figure 14:
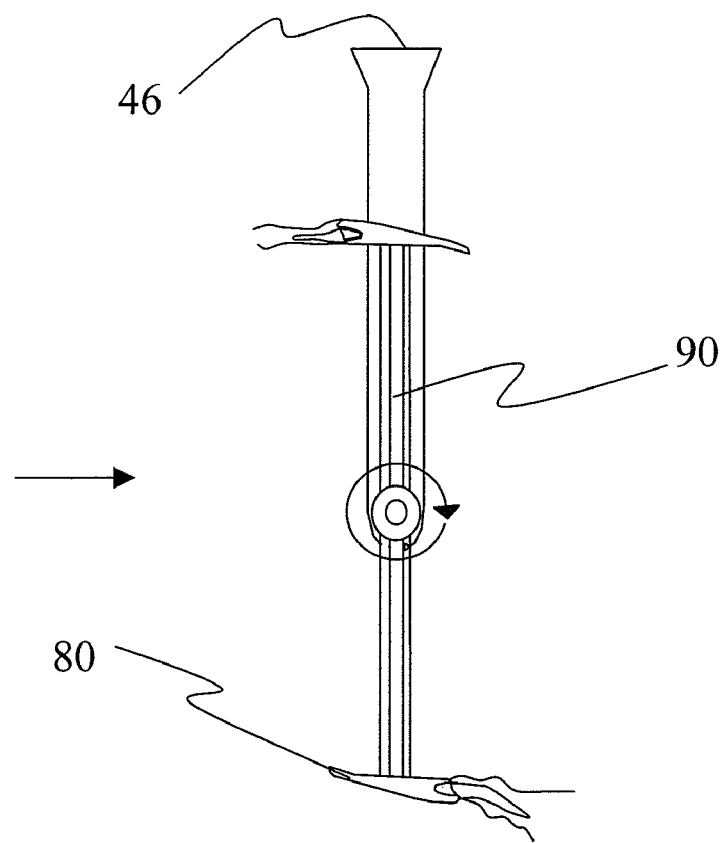
FIG. 14 illustrates a side-view of the mixer of FIG. 13 according to one embodiment of the present invention.

Referring now to FIG. 13, a gas liquid mixer, analogous to a Darius or Gorlov spelling turbine is shown having a gas inlet 46 is in gaseous communication with an aspirating frame 90, which has a central shaft and radially extending arms. The arms of the aspirating frame 90 are connected to radially pumping blades 100. The radially pumping blades 100 have a forward portion 102 and a trailing portion 104. The trailing portion 104 is in communication with aspirating frame 90 by way of one or more apertures 106. As with earlier described blades of the present invention, the radially pumping blades create low pressure zones in their wake which, in turn, aspirates gas into the gas cavity 104 then into the liquid 2. A rotating seal 92 prevents flooding of the aspirating frame 90 and gas inlet 46 during rotation of the diagonally pumping blades 100. The arrows in FIG. 14 indicate direction of liquid 2 flow. FIG. 14 illustrates a side view of the mixer 1 shown in FIG. 13.

For illustrative purposes, the mixers 1 of FIG. 8 through 14 show only two blades. The mixers 1 may have any number of blades, for example, six or eight blades.

Figure 15:
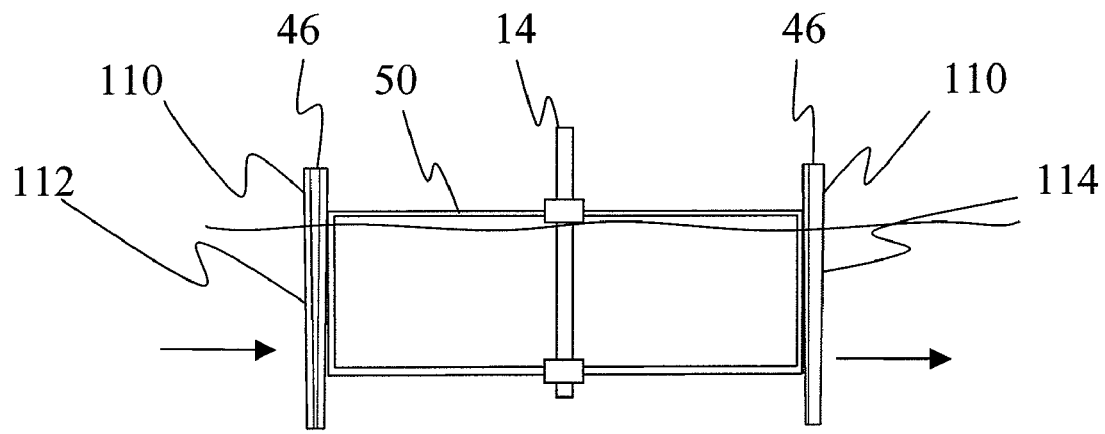
FIG. 15 illustrates a mixer having perpendicularly pumping blades according to one embodiment of the present invention.

Referring now to FIG. 15, a mixer 1 is shown having perpendicularly pumping blades 110 with forward portion 114 and trailing portion 112. This mixer is configured to pump water in a direction perpendicular to the vertical shaft 14. Again, the blades 110 are in communication with a gas inlet 46 above the surface of the liquid 2.

It has been contemplated that membranes and conduits to improve circulation within the containment vessel as described in U.S. application Ser. No. 11/668,816 to Hills maybe of benefit to the mixers 1 of the present invention. It has also been contemplated that the turning vanes of U.S. application Ser. No. 11/668,816 to Hills maybe beneficial to the mixers of FIGS. 8-12 of the present invention including pre-rotation vanes within the draft tube.

Figure 16:
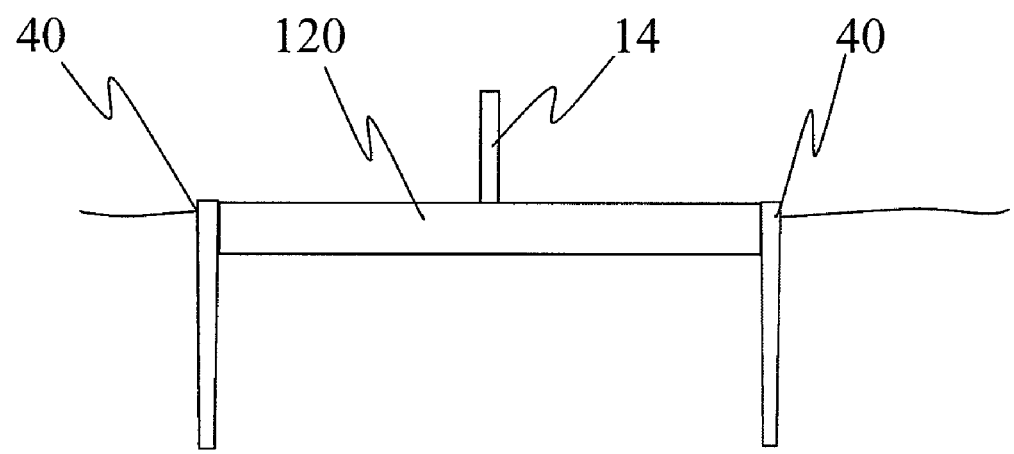
FIG. 16 illustrates a mixer supported by a float having radially pumping blades attached to the float according to one embodiment of the present invention.
Figure 17:
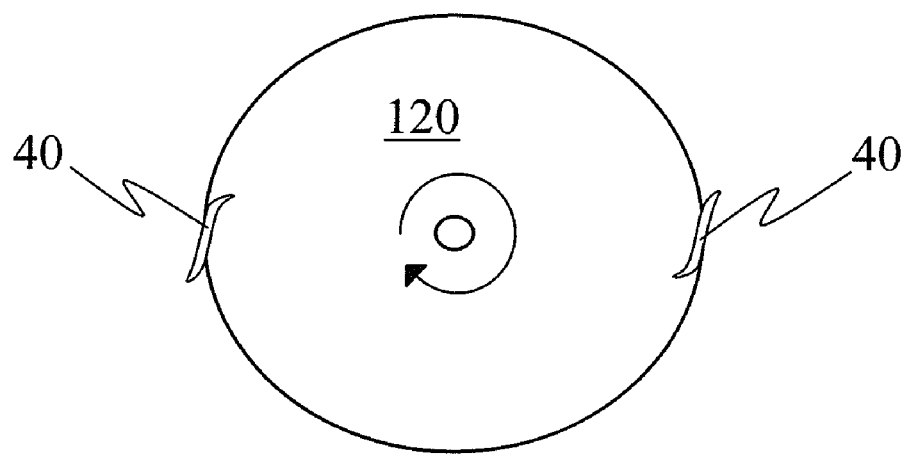
FIG. 17 illustrates a plan view of the mixer of FIG. 16 according to one embodiment of the present invention.

Referring now to FIGS. 16 and 17, the mixers of FIGS. 5-15, although not shown, are often supported by structural members, which support the mixers and drive attached thereto. However, as seen in FIGS. 16 and 17 these supports may not be necessary. As seen in FIG. 16, the shaft 14 may be connected to a float 120 to support the mixer. The blades may also be supported on a rotating float. The blades 40 may be attached to or incorporated in the float 120.

Whereas particular embodiments of this invention have been described above for purposes of illustration, it will be evident to those skilled in the art that numerous variations of the details of the present invention may be made without departing from the invention as defined in the appended claims.

The invention claimed is:

1. An apparatus for mixing gas and liquid comprising:
 a rotatable shaft having an axis of rotation; and
 at least one pumping blade at least partially submergible in the liquid and mounted on the rotatable shaft, the at least one pumping blade comprising a leading edge and a gas cavity trailing the leading edge of the at least one pumping blade,
 wherein the rotatable shaft comprises a central drive shaft and an outer shaft forming a gas inlet in communication with the gas cavity, and wherein rotation of the at least one pumping blade through the liquid causes the liquid to move in a direction substantially perpendicular to the axis of rotation of the rotatable shaft and causes the gas to be entrained in the liquid from the gas cavity.

2. An apparatus for mixing gas and liquid according to claim 1, wherein the rotatable shaft is vertically arranged and partially submerged in the liquid and wherein a gas inlet extends above the liquid.

3. An apparatus for mixing gas and liquid according to claim 2, comprising a plurality of the pumping blades extending radially from the outer shaft and submerged in the liquid, wherein pumping blades deeper in the liquid are longer than pumping blades shallower in the liquid.

4. An apparatus for mixing gas and liquid comprising:
 a rotatable shaft;
 at least one radially pumping blade at least partially submerged in a liquid, the at least one radially pumping blade comprising a leading edge and a gas cavity trailing the leading edge of the at least one radially pumping blade;
 means for attaching the at least one radially pumping blade to the rotatable shaft; and
 a gas inlet above the liquid in communication with the gas cavity of the at least one blade.

5. An apparatus for mixing gas and liquid according to claim 4, wherein the rotatable shaft has an axis of rotation that is substantially vertical, and the at least one radially pumping blade extends in a substantially vertical direction.

6. An apparatus for mixing gas and liquid according to claim 4, wherein the at least one radially pumping blade extends in a generally diagonal direction with respect to the rotatable shaft, and a lower portion of the at least one radially pumping blade is further from the rotatable shaft than an upper portion of the at least one radially pumping blade.

7. An apparatus for mixing gas and liquid according to claim 4, wherein the gas inlet is located on a portion of the at least one blade above the liquid.

8. An apparatus for mixing gas and liquid according to claim 7, further comprising a draft tube coaxial with the rotatable shaft located adjacent and below the at least one blade.

9. An apparatus for mixing gas and liquid according to claim 8, further comprising axially pumping blades projecting radially from a lower portion of the rotatable shaft.

10. An apparatus for mixing gas and liquid according to claim 4, wherein the gas inlet is located on a portion of the at least one blade above the liquid and wherein the at least one radially pumping blade is structured and arranged to also pump axially.

11. An apparatus for mixing gas and liquid according to claim 4, wherein the means for attaching the at least one radially pumping blade to the rotatable shaft comprises a frame.

12. An apparatus for mixing gas and liquid according to claim 4, wherein the means for attaching the at least one radially pumping blade to the rotatable shaft comprises a float.

13. An apparatus for mixing gas and liquid according to claim 4, wherein the means for attaching the at least one radially pumping blade to the rotatable shaft comprises a frame attached to the shaft and the at least one blade and wherein the rotatable shaft is substantially horizontally configured and wherein the at least one radially pumping blade is substantially horizontally configured.

14. An apparatus for mixing gas and liquid according to claim 13, wherein the rotatable shaft, at least one blade and frame are completely submerged in the liquid.

15. An apparatus for mixing gas and liquid according to claim 14, wherein the gas inlet is in communication with the gas cavity of the at least one radially pumping blade through the frame.

* * * * *